G. A. LAWRENCE.
YIELDING ROLL.
APPLICATION FILED JAN. 5, 1914.
1,232,053.
Patented July 3, 1917.
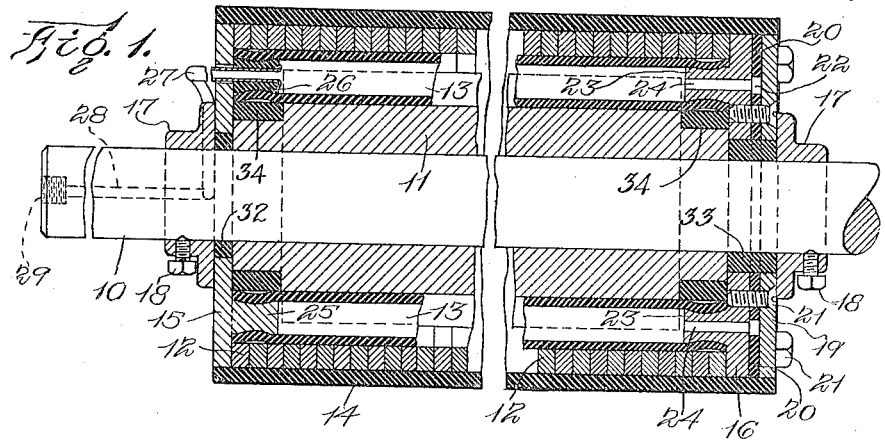
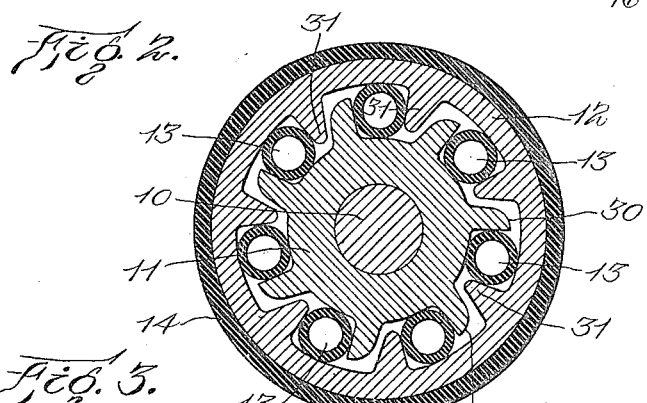
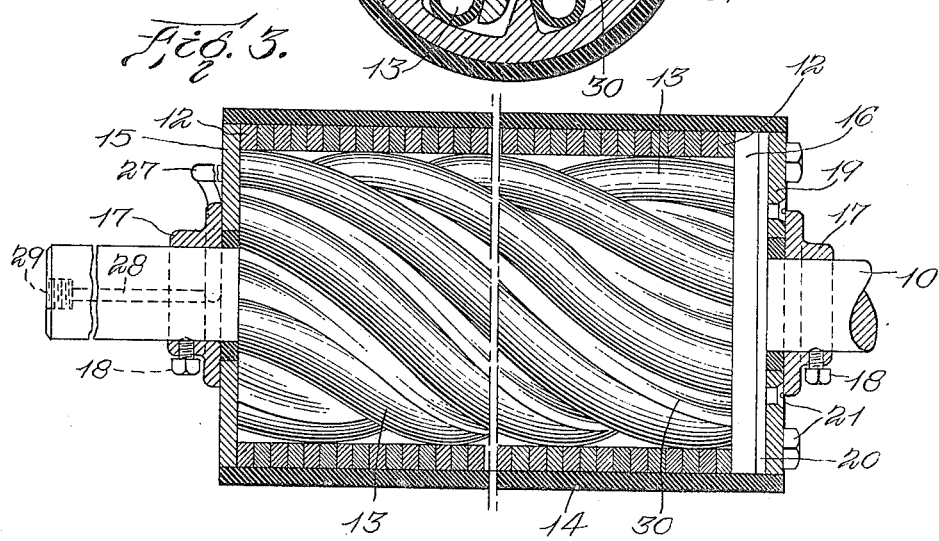
Witnesses:
Inventor:
George A. Lawrence

UNITED STATES PATENT OFFICE.

GEORGE A. LAWRENCE, OF WOBURN, MASSACHUSETTS.

YIELDING ROLL.

1,232,053.  Specification of Letters Patent.  Patented July 3, 1917.

Application filed January 5, 1914. Serial No. 810,293.

*To all whom it may concern:*

Be it known that I, GEORGE A. LAWRENCE, a citizen of the United States, and resident of Woburn, in the county of Middlesex and State of Massachusetts, have invented certain new and useful Improvements in Yielding Rolls, of which the following is a specification.

The present invention relates to yielding rolls, and embodies certain new features of structure whereby the working surface of a roll may be supported so as to yield transversely of the axis of the roll and whereby the yielding element may be used to transmit rotation to the working surface. Yielding rolls are commonly used in leather-working machines, and the present invention as illustrated is embodied in a roll suitable for a leather-working machine, such for instance as used for fleshing or unhairing, but the invention is not limited to any specific use.

Of the accompanying drawings:

Figure 1 represents a longitudinal section of a roll embodying this invention, a portion of the roll being broken out.

Fig. 2 represents a cross section of the roll.

Fig. 3 represents a view similar to Fig. 1, showing the yielding elements formed helically. A cross section of this form would be like Fig. 2.

The same reference characters indicate the same parts wherever they occur.

Referring first to Fig. 1, the roll is shown as being mounted upon a shaft 10. A core or sleeve 11 is fixed upon the shaft by any suitable means (not shown). These constitute what may be regarded as the inner member of the roll and may be formed separately or integrally as desired. A plurality of rings 12 of any suitable material, such as brass, surround the core 11 and are supported by yielding means which as shown comprise a plurality of separate members 13. These yielding members are preferably of tubular form and are adapted to be inflated. They are preferably made of rubber and are connected with each other so that the pressure in them will be equalized.

The rings 12 are movable relatively to each other transversely to the axis of the roll, and as they are supported exclusively by the yielding elements 13 some of the rings may be displaced more than others by pressure against the periphery of the roll, the independent movement of the rings enabling the periphery of the roll to conform to irregularities in the work or other article which is brought to bear against the roll. The rings are surrounded, if desired, by a tubular cover of pliant material 14, such as rubber, which may be reinforced by woven fabric if desired. The rubber may be vulcanized to the rings if desired, and the rings and cover constitute an outer member which, as will be subsequently explained, is internally grooved longitudinally to receive the longitudinally arranged air tubes. The rings 12 are confined between end plates or headers 15 and 16 and these plates are confined by collars 17 secured upon the shaft by set-screws 18. An annular disk 19 is interposed between the plate 16 and the adjacent collar 17; and rings 20 of packing material, such as rubber, are interposed between the plate 16 and disk 19. The members 16 and 19 are connected by screws 21 which draw them together against the rings 20 to form airtight joints. An annular space 22 is left between the rings 20, which space is provided to form communication between the several pneumatic tubes 13 to equalize the pressure in said tubes. The plate 16 is provided with a circular series of nipples 23 which are bored as indicated at 24 to provide ports communicating with the annular chamber 22. One end of each pneumatic tube is arranged upon a nipple 23, the joints thereof being airtight. The plate 15 is likewise provided with nipples, which are indicated at 25. The other end of each pneumatic tube, with one exception, is arranged upon one of the nipples 25 and made tight thereon, the nipples acting as closures for the ends of the tubes. The one exception is the tube which is shown at the top of Fig. 1. This tube has a bushing 26 through which an inflating tube 27 extends. Compressed air flowing into this pneumatic tube through the inflating tube passes out from the other end of the rubber tube through the bore 24 and into the annular chamber 22 and is distributed to the other tubes 13 so as to inflate all the pneumatic tubes to the same pressure. The tube 27 is connected with the shaft 10 to receive compressed air from a conduit 28 bored in the shaft. The shaft is provided with a screw-threaded socket 29 to receive a pressure-retaining valve or a connection whereby the pneumatic tubes may be connected with a source of compressed air.

As shown by Fig. 2, the core 11 has a series of radial projections 30 which are arranged between the pneumatic tubes 13. These projections are elongated and constitute ribs. Each ring 12 has a series of radial projections 31 which are likewise arranged between the pneumatic tubes, sufficient space being left between the radial projections of the core and of the rings to receive the pneumatic tubes and leave slight clearance. These projections and ribs constitute means for interlocking the outer member (in this case the plurality of rings) and the core or inner member with the pneumatic cushioning devices or tubes. If the shaft 10 be rotated, rotation will be transmitted by the radial projections of the core to the radial projections of the rings 12 through the pneumatic tubes 13, thus using the pneumatic tubes to effect a yielding drive of the working surface, as well as to permit the working surface to yield transversely of the axis of the roll. The ribs 31 of the outer member extend into the grooves of the core or inner member, and the ribs 30 of the inner member extend into the grooves of the outer member. If the roll be driven in the reverse direction, the ribs of one member will impart a rotative thrust upon the ribs of the other member, and yet the air tubes will permit the outer member to yield transversely of the axis of the inner member.

The plate 15 is supported by a ring 32 of yielding material, such as rubber, carried by the shaft, and the plates 16 and 19 are supported by a ring 33 of similar yielding material. The ends of the core 11 where they are lapped by the nipples 23 and 25 are reduced in diameter, and built up by rings 34 of yielding material. The several rings of yielding material enable the plates to yield transversely with relation to the shaft in consequence of pressure against the roll, near the ends thereof. The yielding of the plates enables the rings 12 which surround the nipples 23 and 25 to yield sufficiently, whereas if the plates were rigidly supported by the shaft the nipples would restrict the range of yielding movement of the surrounding rings 12.

As shown by Fig. 3, the pneumatic tubes 13 are formed helically and the radial projections of the core and of the rings 12 are likewise formed. In all other respects the structure of the form shown by Fig. 3 is the same as that shown by Fig. 1. I am the first, so far as I am aware, to have embodied in a yielding roll a construction whereby the yielding pneumatic means which supports the working surface of the roll serves also to transmit rotation non-frictionally from the center of the roll to the periphery, and I contemplate claiming this feature as broadly as possible without limiting the pneumatic yielding element or elements to any particular form excepting where limitations are expressed. I believe I am also the first to have provided a yielding roll with one or more pneumatic tubes extending endwise of the roll and also to provide a plurality of such tubes connected with each other so that their internal pressure is equalized.

I claim:

1. A yielding roll comprising a core, a series of expansible pneumatic tubes upon said core and extending endwise thereof, means connecting said tubes for equalizing the pressure therein, a series of relatively movable rings surrounding and bearing upon said tubes, said core and said rings having radial projections arranged between said tubes for transmitting and receiving rotation through said tubes, and a tubular cover of pliant material upon said rings.

2. A yielding roll comprising a core, a series of expansible pneumatic tubes upon said core and extending endwise thereof, said tubes being closed at one end and connected at the other end to equalize the pressure therein, a series of relatively movable rings surrounding and bearing upon said tubes, said core and rings having projections arranged between said tubes, and a tubular cover of pliant material upon said tubes.

3. A yielding roll comprising a core, a series of rings surrounding said core, said rings being movable relatively to each other transversely of the axis of the roll, and pneumatic yielding means arranged between and engaging the periphery of said core and the interior walls of said rings for yieldingly supporting said rings, said core and rings having projections also engaging said pneumatic yielding means whereby rotation is transmitted from said core to said rings through said pneumatic yielding means.

4. A yielding roll comprising a horizontally grooved core, an outer member surrounding said core, and a plurality of compressible pneumatic tubes arranged in the grooves of said core and located between said core and outer member to support said outer member, and means connecting said tubes for equalizing the pressure therein.

5. A yielding roll comprising a plurality of substantially annular sections arranged side by side and movable relatively to each other transversely of the axis of the roll, a core extending through said sections, a plurality of compressible pneumatic tubes extending longitudinally of the roll between said core and sections for supporting said sections, and means connecting said tubes for equalizing the pressure therein.

6. A yielding roll comprising an inner member, an outer member, a plurality of pneumatic tubes between said members and extending longitudinally thereof, and a header at the one end of said members having nipples engaged with said tubes.

7. A yielding roll comprising a shaft, an inner member thereon, an outer member, a plurality of pneumatic tubes between the inner member and the outer member, means for interlocking said members with said tubes, and a header on said shaft having nipples engaging the ends of said tubes.

8. A yielding roll comprising a shaft, a member fast on said shaft, an outer member, a plurality of pneumatic tubes between said members, means for interlocking said members with said tubes, whereby the rotation of one of said members effects the rotation of the other member through the medium of said tubes, headers at the ends of said members, means for connecting said tubes with one of said headers, means for introducing air into said tubes, and means for equalizing the air pressure in said tubes.

9. A yielding roll comprising a core, an outer member surrounding the core, compressible tubular means arranged between said core and said outer member and yieldingly supporting said outer member, and means for interlocking said core and said member with said tubular means, whereby rotation may be transmitted uniformly from the core to the outer member.

10. A yielding roll comprising a core, an outer member, and pneumatic means between said core and outer member for yieldingly supporting and sustaining said outer member, said pneumatic means comprising a plurality of helical tubes.

11. A yielding roll comprising an inner member, a substantially annular outer member surrounding said inner member, and pneumatic means supported by said inner member for supporting said outer member, said pneumatic means being interlocked with said members to transmit rotation from one of said members to the other.

12. A yielding roll comprising inner and outer elements, said outer element being substantially annular and having a yielding working periphery, pneumatic means carried by said inner element for supporting said outer element, and means for interlocking the outer and inner elements with said pneumatic means, whereby said pneumatic means transmits rotation from one of said elements to the other.

13. A yielding roll comprising two end disks one at each end, yielding means supporting said disks to permit movement thereof transversely of the axis, a series of annular members arranged side by side between said disks, a core within said annular members, and a plurality of compressible pneumatic tubes extending longitudinally through said annular members and carried by said core for supporting said annular members, said annular members being movable independently transversely of said axis.

14. A yielding roll comprising two end disks one at each end, yielding means supporting said disks to permit movement thereof transversely of the axis, a series of annular members arranged side by side between said disks, a core within said annular members, a plurality of compressible pneumatic tubes extending longitudinally through said annular members and carried by said core for supporting said annular members, and means connecting said tubular members for equalizing the pressure therein.

15. A yielding roll comprising a longitudinally-grooved core, an outer longitudinally-grooved member, pneumatic tubes arranged in the grooves of said core and said member to support the outer member yieldingly, means for connecting the tubes, and means by which air may be supplied to said tubes.

16. A yielding roll comprising a core having a plurality of longitudinal ribs, an outer member having a plurality of grooves, said ribs projecting into said grooves, and a plurality of compressible pneumatic tubes arranged between said core and said outer member for yieldingly supporting said outer member.

17. A yielding roll comprising a core having a plurality of longitudinal ribs, an outer member having a plurality of grooves, said ribs projecting into said grooves, a plurality of compressible pneumatic tubes arranged between said core and said outer member for yieldingly supporting said outer member, and means for connecting said tubes to equalize the pressure therein.

18. A yielding roll comprising a longitudinally and internally grooved outer member, a plurality of pneumatic tubes arranged in the grooves of the outer member, an inner member grooved to receive said tubes, said inner member having an air passage, and means for conducting air from said air passage to said tubes.

19. A yielding roll comprising a longitudinally and internally grooved outer member, a plurality of pneumatic tubes arranged in the grooves of the outer member, an inner member grooved to receive said tubes, and projecting at its ends beyond the outer member whereby it may be journaled in bearings, said inner member being longitudinally grooved to receive said tubes, and having an air passage extending through one of said ends to receive compressed air, and means connecting said air passage with said tubes.

In testimony whereof I have affixed my signature, in presence of two witnesses.

GEORGE A. LAWRENCE.

Witnesses:
 EDWARD JOHNSON,
 HAROLD P. JOHNSON.

Copies of this patent may be obtained for five cents each, by addressing the "Commissioner of Patents, Washington, D. C."